US009033323B2

(12) United States Patent
Kawakami

(10) Patent No.: US 9,033,323 B2
(45) Date of Patent: May 19, 2015

(54) CLAMP DEVICE

(75) Inventor: Takayuki Kawakami, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 262 days.

(21) Appl. No.: 13/634,941

(22) PCT Filed: Apr. 27, 2011

(86) PCT No.: PCT/JP2011/060222
§ 371 (c)(1),
(2), (4) Date: Sep. 18, 2012

(87) PCT Pub. No.: WO2011/142257
PCT Pub. Date: Nov. 17, 2011

(65) Prior Publication Data
US 2013/0042443 A1    Feb. 21, 2013

(30) Foreign Application Priority Data

May 10, 2010    (JP) .................................. 2010-108089

(51) Int. Cl.
*B23Q 3/06* (2006.01)
*B23Q 1/00* (2006.01)

(52) U.S. Cl.
CPC .......... *B23Q 1/009* (2013.01); *Y10T 24/44068* (2015.01); *Y10T 24/44009* (2015.01)

(58) Field of Classification Search
CPC .......... B25B 5/062; B25B 5/04; B25B 5/061; B25B 5/12; B23Q 3/00; B23Q 3/06
USPC .......................... 269/309–310, 32, 20, 24–27
See application file for complete search history.

(56) References Cited

U.S. PATENT DOCUMENTS

| 5,190,272 | A | * | 3/1993 | Zika et al. ..................... | 269/309 |
| 6,095,509 | A | | 8/2000 | Yonezawa | |
| 6,527,266 | B1 | * | 3/2003 | Yonezawa et al. ............ | 269/309 |
| 6,691,994 | B2 | * | 2/2004 | Kawakami ..................... | 269/309 |
| 6,988,720 | B2 | * | 1/2006 | Kawakami ..................... | 269/309 |
| 7,303,186 | B2 | * | 12/2007 | Yonezawa et al. ............ | 269/309 |
| 8,235,370 | B2 | * | 8/2012 | Kawakami ..................... | 269/310 |
| 8,246,029 | B2 | * | 8/2012 | Kawakami ..................... | 269/310 |
| 8,585,027 | B2 | * | 11/2013 | Kawakami ....................... | 269/25 |
| 2003/0098539 | A1 | * | 5/2003 | Kawakami ..................... | 269/309 |
| 2004/0046302 | A1 | * | 3/2004 | Bernhard et al. ............ | 269/309 |
| 2006/0049568 | A1 | * | 3/2006 | Yonezawa et al. ............ | 269/309 |
| 2007/0063406 | A1 | * | 3/2007 | Soroka et al. ................ | 269/309 |
| 2013/0042443 | A1 | * | 2/2013 | Kawakami ....................... | 24/456 |

FOREIGN PATENT DOCUMENTS

| DE | 4 020 981 | 1/1992 |
| JP | 11-188551 | 7/1999 |
| JP | 2009-255219 | 11/2009 |

* cited by examiner

*Primary Examiner* — Lee D Wilson
(74) *Attorney, Agent, or Firm* — Jordan and Hamburg LLP

(57) ABSTRACT

A clamp device includes a clamp main body, an engagement assembly, a clamp rod, a drive mechanism, and a support mechanism. The engagement assembly can be changed over between a diameter-expanded state in which it engages with an inner circumferential surface of an aperture in a workpiece, and a diameter-reduced state in which it does not so engage. The clamp rod is engaged with an interior of the engagement assembly. The drive mechanism drives the clamp rod to and from the clamp main body. The support mechanism supports the engagement assembly with a pneumatic force of pressurized air. At least a part of the pneumatic force is released after the engagement assembly has been expanded in diameter.

8 Claims, 7 Drawing Sheets

CLAMP DEVICE

BACKGROUND OF THE INVENTION

The present invention relates to a clamp device which grips and fixes the inner circumferential surface of a hole in a workpiece, and in particular relates to a clamp device which, while ensuring a support function of supporting an engagement assembly for gripping, also is capable of eliminating at least a portion of the support force after gripping.

Conventionally, clamp devices of various types (so called hole clamps or expansion clamps) that grip the inner circumferential surface of a hole in a workpiece have been put into practical use. For example, a clamp device such as disclosed in Patent Documents #1 and #2 includes a clamp main body, an engagement assembly that passes vertically through a through hole in the clamp main body and that has grip claw portions, a clamp rod for expanding the diameter of the engagement assembly, a drive means consisting of a hydraulic cylinder for driving the clamp rod to and fro, and so on.

The clamp devices described above are hydraulic clamp devices in which the clamp rod for clamping is driven by supply of hydraulic pressure to a hydraulic chamber for clamping of a hydraulic cylinder. A pressurized air type clamp device has also been put into practical use that performs clamp driving with the biasing force of pressurized air, instead of with the hydraulic force. The drive means of such a pressurized air type clamp device comprises a piston member that is linked to the clamp rod, an air operating chamber for clamping above the piston member, an air operating chamber for unclamping below the piston member.

With the clamp devices of Patent Documents #1 and #2, a spring type support mechanism that supports the engagement assembly from below in order to expand the diameter of the engagement assembly comprises an annular support member that supports the lower end of the engagement assembly, a compression spring member that supports the annular support member upwards with elastic force.

And a clamp device has been put into practical use that, instead of the compression spring member, is provided with a hydraulic support mechanism that supports the engagement assembly with hydraulic pressure, or that is provided with a pressurized air type support mechanism that supports the engagement assembly with pneumatic pressure.

Now sometimes it happens that, if the support force of the spring type support mechanism is not sufficient, during clamping, the grip claw portions of the engagement assembly do not properly grip the inner circumferential surface of the hole in the workpiece, but slip with respect to the inner circumferential surface. Due to this it is necessary to employ a spring capable of generating a rather large support force as the compression spring member of the support mechanism. The same is true for a hydraulic support mechanism and for a pressurized air type support mechanism.

It should be understood that a clamp device has also been put into practical use, including a clamping miss detection means that detects whether the clamping is good or bad, by means of blocking a pressurized air ejection hole that is formed in the clamp main body by an annular support member of the support, mechanism that shifts along with the clamp rod, when during clamping the engagement assembly does not properly grip the inner circumferential surface of the hole and slips, and the clamp rod shifts to its limit position in the clamping direction.

On the other hand, since swarf may enter into the interior of the clamp main body when a workpiece clamped with a clamp device of this type is subjected to machining (cutting processing), accordingly, in order to prevent this, an air blowing means is provided to the clamp device and supplies pressurized air to the interior of the clamp main body, so that this air is ejected to the exterior from clearances between the clamp main body, the engagement assembly, the clamp rod, and so on.

Patent Document #1: German Patent No. 4,020,981.
Patent Document #2: Japanese Laid-Open Patent Publication Heisei 11 188551.

SUMMARY OF THE INVENTION

Since, both during the clamped state and during the unclamped state, the spring type support mechanisms of the clamp devices of the Patent Documents #1 and #2 generate support force due to their compression spring members, and bias the engagement assemblies in the unclamping direction, accordingly the clamping force that is generated by the clamp drive means is reduced by just the amount of this support force. For this reason, there is the problem that it is necessary to increase the size of the clamp drive means by just the amount of this decrease in the clamping force.

On the other hand, with a pressurized air type support mechanism, there are provided an annular pressure reception member that supports the lower end of the engagement assembly, and a support air chamber that applies pneumatic pressure to the lower end surface of the annular pressure reception member, and, during unclamping, pressurized air is supplied to the support air chamber. In the case of this clamp device, during clamping, even if the pressurized air is discharged in steps from the air operating chamber for unclamping, some support force remains because the pressurized air is not fully discharged from the support air chamber. Accordingly, in a similar manner to that described above, the clamping force that is generated by the clamp drive means is reduced by just the amount of this support force. For this reason, there is the problem that it is necessary to increase the size of the clamp drive means by just the amount of this decrease in the clamping force.

The object of the present invention is to provide a clamp device that is capable of supporting an engagement assembly with the pneumatic force of pressurized air while the engagement assembly is expanding in diameter, while also eliminating at least a portion of the pneumatic force after the engagement assembly has expanded in diameter, to provide a clamp device that is capable of preventing the pneumatic force of pressurized air for blowing from exerting on an annular pressure reception member of the support mechanism after the engagement assembly has expanded in diameter, to provide a clamp device that can be made more compact, and so on.

The present invention relates to a clamp device comprising a clamp main body, an engagement assembly that can be changed over between a diameter-expanded state in which it engages with an inner circumferential surface of an aperture in a workpiece and a diameter-reduced state in which it does not so engage, a clamp rod that is engaged with an interior of the engagement assembly, and a drive means for driving the clamp rod to and fro with respect to the clamp main body, and is characterized by comprising: a support mechanism that, when the engagement assembly is expanded in diameter and is engaged with the inner circumferential surface, supports the engagement assembly with a pneumatic force of pressurized air at a first pressure; and a pneumatic force release means that, when the clamp rod is driven for clamping by the drive means, releases at least a part of the pneumatic force of the support mechanism after the engagement assembly has been expanded in diameter.

ADVANTAGES OF THE INVENTION

According to the present invention, when the workpiece is to be clamped, and when the engagement assembly is to be expanded in diameter to engage with the inner circumferential surface of the hole in the workpiece, it is possible to drive the clamp rod to expand the diameter of the engagement assembly in the state in which the engagement assembly reliably is being supported by the support mechanism with the pneumatic force of the pressurized air at the first pressure. Since at least a portion of the pneumatic force of the support mechanism is canceled by the pneumatic force release means after the engagement assembly has been expanded in diameter, accordingly it is possible to prevent reduction of the clamping force by just the amount of the pneumatic force that is canceled. Since it is possible to prevent decrease of the clamping force, accordingly increase of the size of the drive means is suppressed, and it is possible to make the clamp device more compact.

In addition to the constitution of the present invention described above, it would also be acceptable to employ structures of the following types.

(1) The drive means may comprise an air cylinder for unclamping that releases the clamping of the clamp rod; the support mechanism may comprise an annular pressure receiving piston member that supports the engagement assembly, a support air chamber that applies pressurized air at the first pressure to the annular pressure receiving piston member in an opposite orientation to the clamping direction; and an air supply passage that leads from an air operating chamber for unclamping of the air cylinder for unclamping to the support air chamber; and, in order to blow air against the engagement assembly and the clamp rod with pressurized air at the second pressure which is a lower pressure than that of the pressurized air at the first pressure, a pressurized air introduction means may be provided that introduces pressurized air at the second pressure to a portion within the clamp main body that is more towards the engagement assembly than the annular pressure receiving piston member.

Since, according to this constitution, the drive means includes the air cylinder for release that releases the clamping, and the support mechanism includes the annular pressure receiving piston member, the support air chamber that applies pressurized air at the first pressure to this annular pressure receiving piston member in the opposite orientation to the clamping direction, and the air supply passage that leads from an air operating chamber for release of the air cylinder for release to the support air chamber, accordingly it is possible to supply the pressurized air at the first pressure that has been supplied to the air cylinder for release to the support air chamber via the air supply passage. The pressurized air introduction means introduces pressurized air at the second pressure lower than the first pressure to the portion within the clamp main body that is more towards the engagement assembly than the annular pressure receiving piston member, so that it is possible to blow air against the engagement assembly and the clamp rod, and it is possible to prevent the ingress of swarf or dust into the clamp main body.

Moreover, since the pressurized air for blowing at the second pressure acts on the upper surface of the annular pressure receiving piston member, while the pneumatic force of the pressurized air in the support air chamber at the first pressure (which is higher than the second pressure) acts on the lower surface of the annular pressure receiving piston member, accordingly it is possible to keep the annular pressure receiving piston member at almost its upper limit position.

(2) In (1) the pneumatic force release means may comprise a check valve interposed in the air supply passage that permits flow in the direction to supply pressurized air to the support air chamber, and a communicating air passage that is formed to pierce through the annular pressure receiving piston member and that is intercepted only when the annular pressure receiving piston member is in its upper limit position.

According to this structure, in the state in which pressurized air is supplied to the support air chamber from the air operating chamber via the check valve, it is possible to supply pressurized air at the first pressure to the support air chamber, but, even if the pressurized air in the air operating chamber for release is discharged during clamping, it is still possible to maintain the pressurized air at the first pressure in the support air chamber via the check valve. For this reason, it is possible reliably to expand the diameter of the engagement assembly during the starting of clamping.

Moreover, since the communicating air passage that is formed to pierce through the annular pressure receiving piston member and that is only intercepted when the annular pressure receiving piston member is in its upper limit position is provided, accordingly a portion of the pressurized air at the first pressure in the support air chamber is discharged via the communicating air passage, and its pressure is decreased until it becomes equal to the pressure of the pressurized air at the second pressure that has been introduced within the clamp main body by the pressurized air introduction means, so that the air pressures above and below the annular pressure receiving piston member become equal, whereby it is possible to prevent pneumatic force from operating on the annular pressure receiving piston member, and it is possible to prevent the annular pressure receiving piston member from shifting to its limit position in the clamping direction. It should be understood that, with this constitution, at least a part of the pneumatic force of the support mechanism is released by the pneumatic force release means.

(3) In (1), the pneumatic force release means may comprise a throttle valve that is interposed in the air supply passage, and a communicating air passage that is formed to pierce through the annular pressure receiving piston member and that is intercepted only when the annular pressure receiving piston member is in its upper limit position.

According to this constitution, it is possible to supply pressurized air from the air operating chamber for release to the support air chamber via the throttle valve. Thus, during clamping, even when discharging the pressurized air in the air operating chamber for release, since the pressurized air in the support air chamber is ejected via the throttle valve with a certain delay, accordingly it is possible to eliminate at least a portion of the pneumatic force of the support mechanism with a certain delay. It should be understood that the beneficial operational effect of the communicating air passage that is formed in the annular pressure receiving piston member is almost the same as in (2).

(4) In any one of (1) through (3), there may be provided a pressurized air ejection hole for detection of clamping miss that is blocked by the annular pressure receiving piston member when the clamp rod is shifted to its limit position in the clamping direction, and an air passage that supplies pressurized air to the pressurized air ejection hole.

Since, according to this constitution, there are provided the pressurized air ejection hole for detection of clamping miss that is blocked by the annular pressure receiving piston member when the clamp rod is shifted to its limit position in the clamping direction, and the air passage that supplies pressurized air to the pressurized air ejection hole, accordingly it is possible to implement detection of clamping miss with a simple structure that operates reliably.

(5) In (1), the drive means may comprise a clamping drive means for driving the clamp rod in the clamping direction. According to this structure, it is possible to drive the clamp rod in the clamping direction with the drive means for clamping that is provided to the drive means.

(6) In (5), the clamping drive means may comprise one or a plurality of compression springs that drive the clamp rod in the clamping direction. According to this constitution, it is possible to drive the clamp rod in the clamping direction by the one or a plurality of compression springs that are provided to the drive means for clamping.

(7) In (5), the clamping drive means may comprise an air cylinder for clamping that generates all or a portion of the drive force for clamp driving the clamp rod. According to this constitution, it is possible to generate all or a portion of the drive force for clamp driving the clamp rod with the air cylinder for clamping that is provided to the drive means for clamping.

DESCRIPTION OF THE PREFERRED EMBODIMENTS

Figure 1:
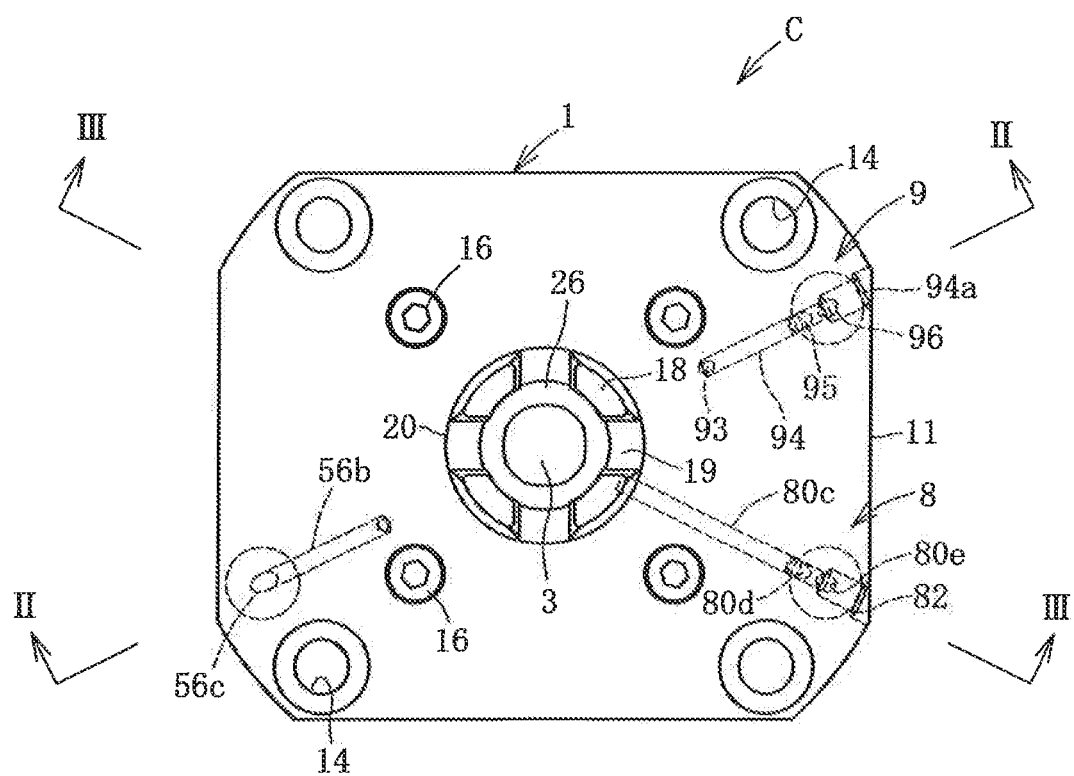
FIG. 1 is a plan view of a clamp device (in its unclamped state) according to Embodiment #1 of the present invention.

The following explanation is based on embodiments for implementation of the present invention.

Embodiment 1

As shown in FIGS. 1 through 4, a clamp device C comprises: a clamp main body 1; an engagement assembly 2 that functions as one or more gripping member; a clamp rod 3 that is engaged with the interior of the engagement assembly 2; a drive means 4 for driving the clamp rod 3 to and fro (up and down); a support mechanism 6; a pneumatic force release means 7; a pressurized air introduction means 8; a clamping miss detection means 9; and so on. The clamp main body 1 comprises an upper main body member 11 and a lower main body member 12, and the clamp main body 1 is attached to a base main body member 13.

The upper main body member 11 has an almost rectangular shape as seen in plan view, and this upper main body member 11 is fixed to the base main body member 13 by four bolts that are inserted into four bolt holes 14. The lower main body member 12 is a tubular or annular member that is formed with a cylindrical hole 41, and the upper end portion of the lower main body member 12 is fitted into a lower surface side concave 15 of the upper main body member 11 and is fixed by four bolts 16. A cylindrical main body barrel portion 20 is provided at the center portion of the upper half portion of the clamp main body 1, and projects upwards.

As shown in FIGS. 1 through 4, the engagement assembly 2 (i.e., the gripping member) and the clamp rod 3 are arranged so as to pierce in the vertical direction through a through hole 17 in the central portion of the upper end portion of the main body barrel portion 20. Four arcuate seating surfaces 18 are formed on the upper surface of the main body barrel portion so as to surround the engagement assembly 2, and the workpiece W is clamped in the state in which the workpiece W is seated on these seating surfaces 18. Four concave grooves 19 are formed on the upper surface of the main body barrel portion 20 in the shape of a cross, and blown pressurized air flows along these grooves.

The engagement assembly 2 is inserted into a hole in the workpiece W along with the clamp rod 3, and can be changed over between a diameter-expanded state in which it engages with the inner circumferential surface of the hole (i.e. in which it grips the inner circumferential surface of the hole), and a diameter-reduced state in which it does not engage the hole (i.e. does not grip it). This engagement assembly 2 has a rod through hole 21 for passing the clamp rod 3, grip claw portions 22, and base end flange portions 23, and, in order for it to be possible to increase and decrease the radius of the engagement assembly 2 (i.e. to expand and shrink it) and moreover in order for it to be possible to disassemble the engagement assembly 2, it is divided into four equal parts around its circumferential direction by four slits, these four parts being held together in a bundle by an O Ring 27.

Teeth are formed in three steps on the outer circumferential surfaces of the grip claw portions 22 of the engagement assembly 2, so as to be capable of gripping the inner circumferential surface of the hole formed in the workpiece W. The portion of the rod through hole 21 that corresponds to these grip claw portions is formed as a tapered hole portion 21a that is closely engaged with a tapered shaft portion 31 of the clamp rod 3.

Figure 2:
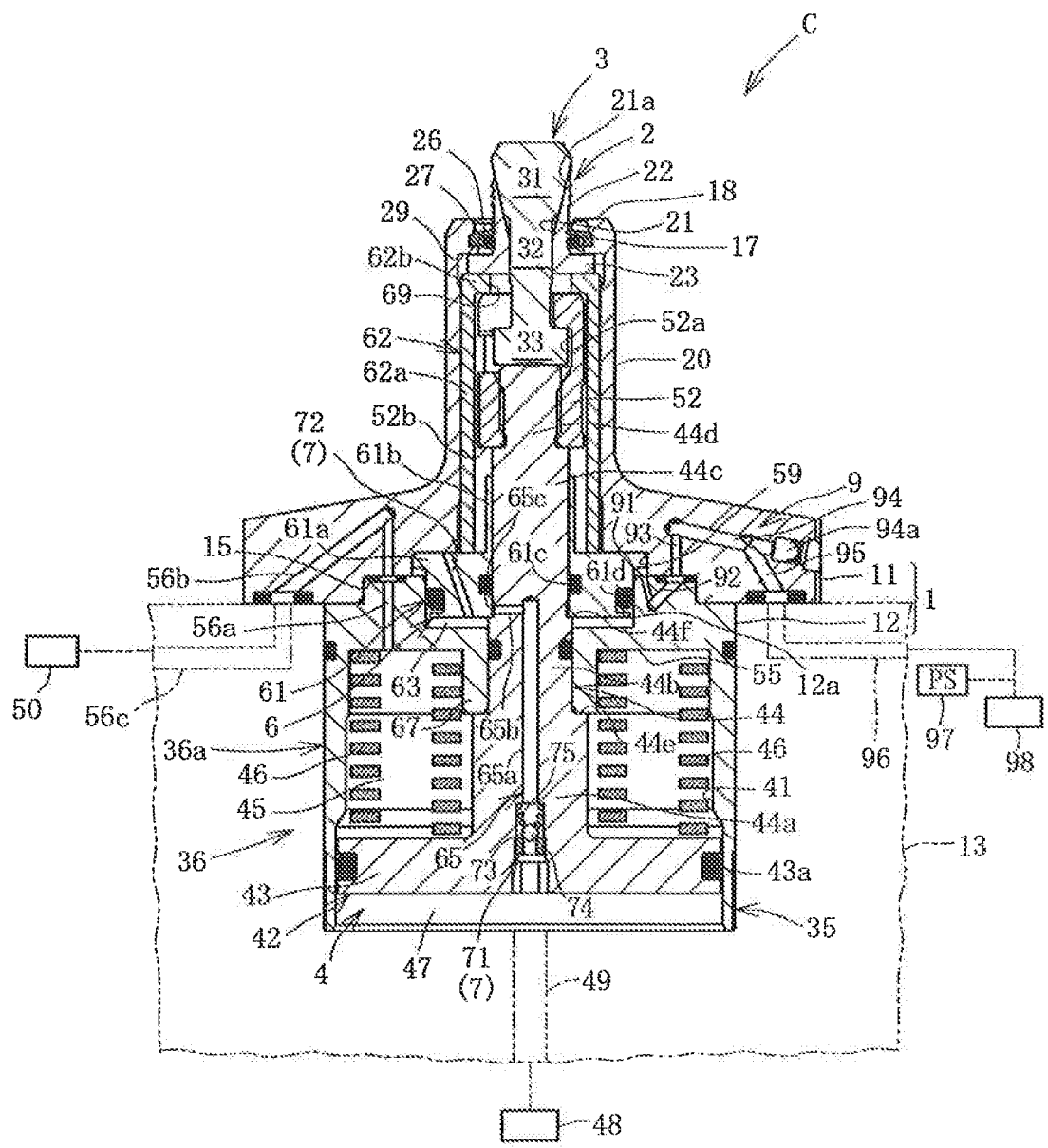
FIG. 2 is a sectional view taken along the line II-II of FIG. 1.
Figure 3:
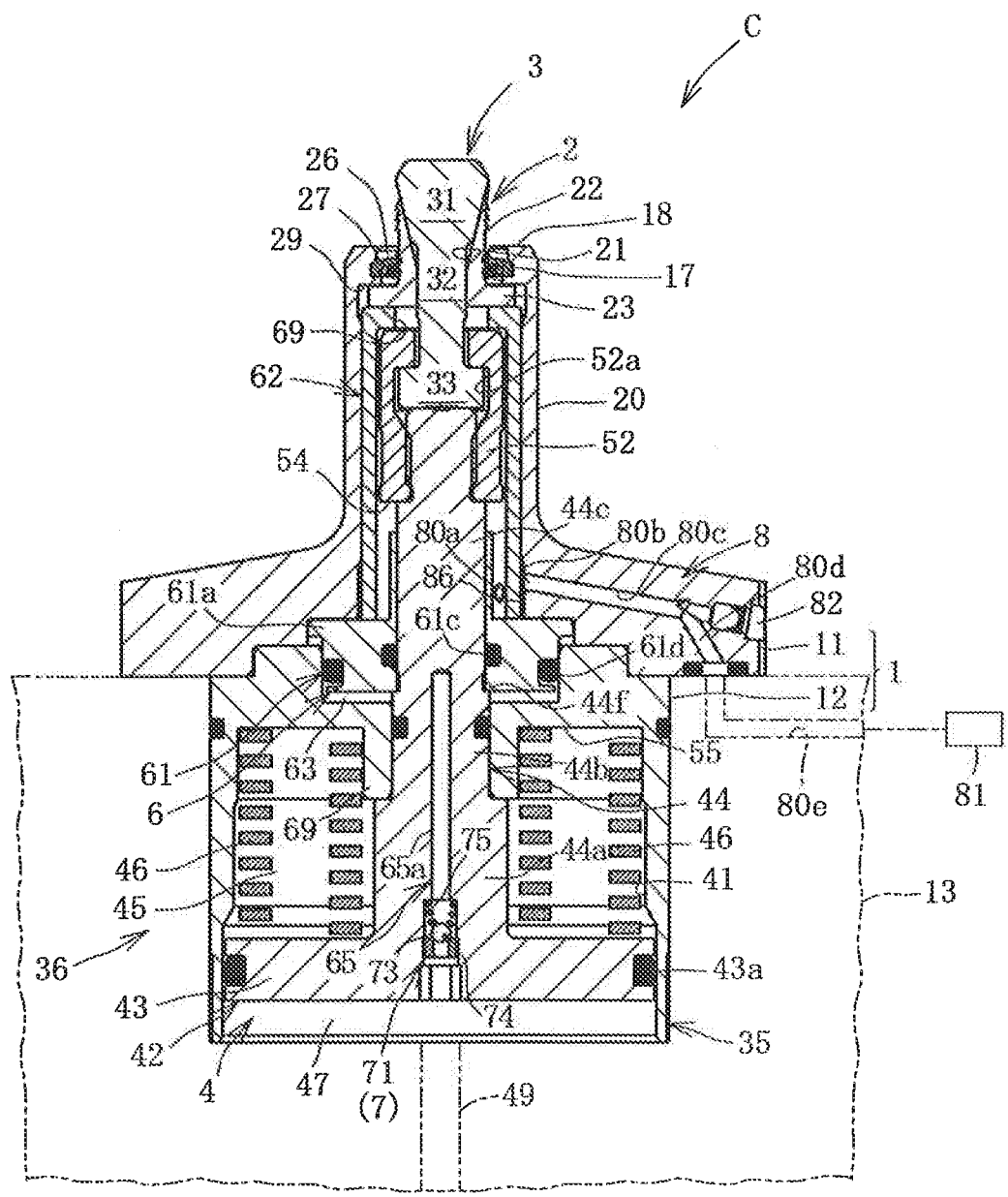
FIG. 3 is a sectional view taken along the line III-III of FIG. 1.
Figure 4:
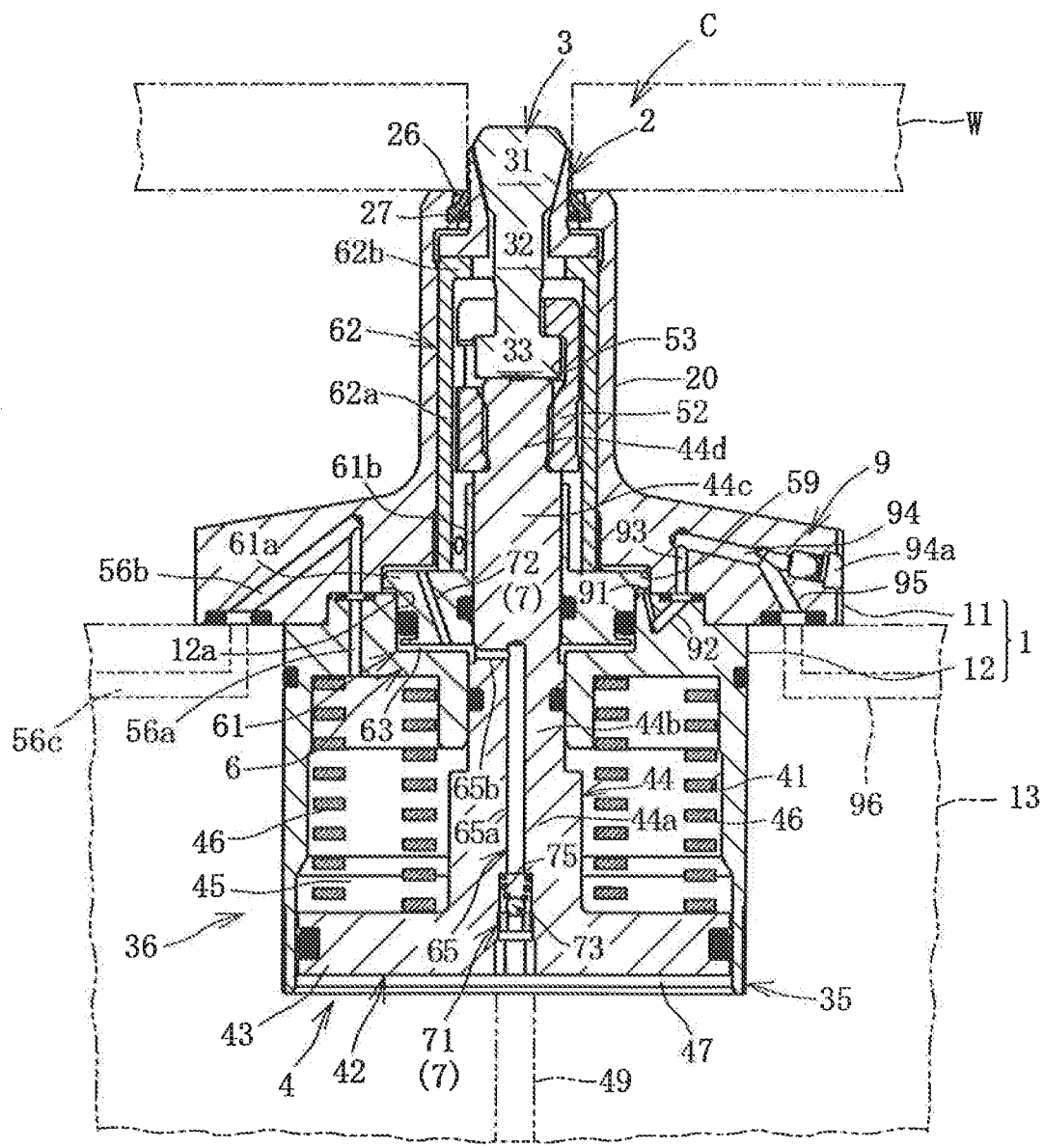
FIG. 4 is a vertical sectional view of the clamp device (in its clamped state)

As shown in FIGS. 2 through 4, a scraper 26 that blocks the annular clearance at the external circumference of the engagement assembly 2 is installed at a certain position in the through hole 17 at the upper end of the main body barrel portion 20. This scraper 26 is a member for providing a function of preventing the ingress of foreign matter such as swarf, and also for providing a function of centering so as to make the axis of the engagement assembly 2 and the clamp rod 3 coincide during the unclamped state with the axis of the clamp device C (which is common with the axis of the main body barrel portion 20). The O ring 27 that holds the four divided members together in a bundle and biases them in the inward radial direction is installed at the lower portion of the engagement assembly 2.

The base end flange portions 23 of the engagement assembly 2 are contained within a circular hollowed portion 29 of the main body barrel portion 20, with a clearance being defined at the external circumference of the base end flange portions 23. The base end flange portions 23 of the engagement assembly 2 are held between an upper wall portion of the circular hollowed portion 29 and a horizontal plate portion 62b of a support member 62, so as to be movable in the horizontal direction, and are supported by the support member 62. The engagement assembly 2 is capable of being raised and lowered integrally together with the support member 62 and an annular pressure receiving piston member 61, it is also installed so as to be shiftable in horizontal directions orthogonal to the axis of the clamp device C, due to the presence of the annular clearance at the external circumference of the circular hollowed portion 29, and via elastic deformation of the scraper 26.

The clamp rod 3 is formed an integral member comprising the tapered shaft portion 31, a small diameter rod portion 32 that continues at the lower end of this tapered shaft portion 31, and a T shaped engagement portion 33 that continues at the lower end of the small diameter rod portion 32. The tapered shaft portion 31 and the small diameter rod portion 32 are passed through the rod through hole 21 of the engagement assembly 2. The tapered shaft portion 31 is formed at the upper end portion of the clamp rod 3 with its diameter increasing upwards, and the tapered shaft portion 31 is fitted into a tapered hole portion 21a of the upper half portion of the rod through hole 21 of the engagement assembly 2.

Next, the drive means 4 will be explained.

As shown in FIGS. 1 through 4, the drive means 4 is a means for driving the clamp rod 3 to and fro (up and down) with respect to the clamp main body 1, and comprises an air cylinder for unclamping 35 that drives the clamp rod 3 upwards for unclamping, and a clamping drive means 36 that drives the clamp rod 3 downwards for clamping. The clamping drive means 36 comprises a plurality of compression springs 46 that drive the clamp rod 3 for clamping, and an air cylinder for clamping 36a that generates a portion of the clamping drive force.

A vertically oriented cylindrical hole 41, an annular spring holding chamber 45 above a piston portion 43 of a piston member 42 that is installed in the cylindrical hole 41, an air operating chamber 47 for unclamping below the piston member 42, etc. are formed in the clamp main body 1.

The air cylinder for unclamping 35 comprises the cylindrical hole 41, the piston member 42, the air operating chamber for unclamping 47. And the air cylinder for clamping 36a comprises the cylindrical hole 41, the piston member 42, an air operating chamber for clamping 45 (i.e. a spring holding chamber).

The piston member 42 comprises the piston portion 43 and a rod portion 44 that extends upwards from the piston portion 43 to the interior of the main body barrel portion 20. The external circumferential portion of the piston portion 43 is sealed by a seal member 43a in an air tight manner. The rod portion 44 comprises a large diameter rod portion 44a, an intermediate diameter rod portion 44b that extends upwards from the large diameter rod portion 44a, a small diameter rod portion 44c that extends upwards from the intermediate diameter rod portion 44b, and a screw axis portion 44d that extends upwards from the small diameter rod portion 44c. A T groove shaped member 52 in which a T groove 52a is formed in an upside down T shape is screwingly engaged with the screw axis portion 44d.

A T shaped engagement portion 33 of the clamp rod 3 is engaged from the horizontal direction into the T groove 52a of the T groove shaped member 52. The external diameter of the T groove shaped member 52 is formed to be slightly larger than the external diameter of the small diameter rod portion 44c. An engagement receiving portion 52b that is engageable with the upper end of a thin sleeve 61b of the annular pressure receiving piston member 61 is formed at the lower end of the T groove shaped member 52. Since a slight clearance is defined between the T shaped engagement portion 33 and the T groove shaped member 52, accordingly the clamp rod 3 can shift in the horizontal direction relative to the T groove shaped member 52 by just the amount of the above described clearance.

The air operating chamber for unclamping 47 is defined below the piston member 42 by the lower main body member 12 and the base main body member 13. Pressurized air at a first pressure that biases the piston portion 43 in the unclamping direction can be supplied from an air supply source 48 via an air passage 49 to the air operating chamber for unclamping 47.

The spring holding chamber 45 is formed at the external circumferential sides of the large diameter rod portion 44a and the intermediate diameter rod portion 44b. Six compression coil springs 46 that generate clamp driving force are installed in the spring holding chamber 45 at regular intervals in the circumferential direction. The upper end portions of the compression springs 46 are inserted into cylindrical holes 55 that are formed in the lower main body member 12, so that their positions in the circumferential direction are fixed. The lower ends of the compression springs 46 are received and stopped by the piston portion 43, and the upper ends of the compression springs 46 are received and stopped by the upper end walls of the cylindrical holes 55.

The compression coil springs 46 are made from spring steel wire material having a rectangular cross section, but it would also be acceptable to make them with spring steel wire material having a circular cross section. It should be understood that the number of the compression coil springs 46 is not limited to being six; it would also be possible to provide less than six, or seven or more, of the compression coil springs 46. It would also be acceptable to install a single compression coil spring 46 fitted over the exterior of the rod portion 44.

The spring holding chamber 45 also serves as an air operating chamber of the air cylinder for clamping 86a, and a pressurized air supply source 50 is connected to the spring holding chamber 45 via air passages 56a through 56c. If the clamping force due to only the biasing force of the compression coil springs 46 is insufficient, then pressurized air is supplied to the spring holding chamber 45 so that a portion of the clamping drive force is generated by the air cylinder for clamping 36a.

FIGS. 2 and 3 show the unclamped state in which the piston member 42 is at its upper limit position, and, in this unclamped state, the upper end portion 44e of the large diameter rod portion 44a is engaged with the engagement portion 67 of the lower main body member 12. A slight clearance is provided between the upper end portion 44f of the intermediate diameter rod portion 44b and the lower end portion of the annular pressure receiving piston member 61, when this piston member 61 is at its upper limit position due to the pressurized air.

Next, the support mechanism 6 will be explained.

As shown in FIGS. 2 through 4, the support mechanism 6 comprises: an annular pressure receiving piston member 61 that is movably fitted over the small diameter rod portion 44c of the piston member 42, and that supports the engagement assembly 2; a support member 62 whose base end portion (i.e. its lower end portion) is supported by the annular pressure receiving piston member 61, and that moreover supports the base end of the engagement assembly 2; a support air chamber 63 that applies the pressure of pressurized air at a first pressure to the annular pressure receiving piston member 61 in the opposite orientation to the clamping direction; and an air supply passage 65 that introduces air from the air operating chamber 47 of the air cylinder for unclamping 35 to the support air chamber 63. The support mechanism 6 is a mechanism for supporting the engagement assembly 2 with the pneumatic force that operates on the annular pressure receiving piston member 61 that receives the pressure of the pressurized air at the first pressure on its lower end surface, when the engagement assembly 2 is expanded in diameter and is engaged with the inner circumferential surface of the workpiece W (i.e., grips the inner circumferential surface).

The annular pressure receiving piston member 61 comprises an engagement flange portion 61*a* that is formed at the upper end portion of the annular piston portion, and a thin sleeve 61*b* that extends upwards for a predetermined length from the internal circumferential portion of the upper end of the annular piston portion. The annular pressure receiving piston member 61 is fitted over the small diameter rod portion 44*c* so as to slide freely, and moreover is fitted into a cylindrical hole 12*a* of the lower main body member 12 so as to slide freely. The internal circumferential portion of the annular pressure receiving piston member 61 is sealed in an air tight manner by a seal member 61*c*, and its external circumferential portion is sealed in an air tight manner by a seal member 61*d*.

The engagement flange portion 61.*a* of the annular pressure receiving piston member 61 is installed in a containment aperture 59 that is defined by the lower main body member 12 and the upper main body member 11, so that it can be raised and lowered in the vertical direction. When the annular pressure receiving piston member 61 is in its lower limit position, its engagement flange portion 61*a* is received and stopped by the lower end wall of the containment aperture 59, and, when the annular pressure receiving piston member 61 is in its upper limit position, its engagement flange portion 61*a* is received and stopped by the upper end wall of the containment aperture 59.

The support member 62 comprises a thin barrel portion 62*a* that is fitted over the exteriors of the thin sleeve 61*b* and the small diameter rod portion 44*c*, and a horizontal plate portion 62*b* at the upper end of the thin barrel portion 62*a*. While the clamp rod 3 is passed through a circular hole 69 in the horizontal plate portion 62*b*, the circular hole 69 is formed to be of a size through which the clamp rod 3 can pass. The horizontal plate portion 62*b* at the upper end of the support member 62 contacts against and supports the lower surface of the base end flange portion 23 of the engagement assembly 2, and the lower end of the thin barrel portion 62*a* is contacted against and supported by the upper end of the annular piston portion of the annular pressure receiving piston member 61, so that the support member 62 is raised and lowered integrally with the annular pressure receiving piston member 61.

A support air chamber 63 below the annular pressure receiving piston member 61 is connected to the air operating chamber for unclamping 47 via an air supply passage 65 that is formed in the rod portion 44, so that pressurized air at the first pressure is supplied from the air operating chamber 47 to the support air chamber 63, and thus, during the unclamping state, the annular pressure receiving piston member 61 is biased upwards by the pressurized air at the first pressure.

The air supply passage 65 comprises a vertically oriented air passage 65*a*, a horizontally oriented air passage 65*b* that communicates with this air passage 65*a*, and an annular groove 65*c* that is formed in the outer circumferential surface of the small diameter rod portion 44*c*. A check valve 71 is provided in the lower end portion of the air passage 65*a* of the air supply passage 65, and only permits the supply of pressurized air to the support air chamber 63. When clamping is released, pressurized air at the first pressure is supplied from the air operating chamber for unclamping 47 via the check valve 71 and the air supply passage 65.

During clamp driving, after the engagement assembly 2 has gripped the inner circumferential surface of the hole in the workpiece W, when the annular pressure receiving piston member 61 shifts downwards by a minute distance (for example 0.1 to 0.3 mm), a communicating air passage 72 that will be described hereinafter opens, and pressurized air is discharged to above the annular pressure receiving piston member 61.

Next, the pneumatic force release means 7 will be explained.

As shown in FIGS. 2 through 4, the pneumatic force release means 7 is a device that, when the clamp rod 3 is driven for clamping by the drive means 4, releases at least a portion of the pneumatic force of the support mechanism 6 after the engagement assembly 2 has been increased in diameter (i.e. after gripping). The pneumatic force release means 7 comprises the air supply passage 65, the check valve 71 that is interposed in the air supply passage 65, and a communicating air passage 72 that is formed so as to pierce through the annular pressure receiving piston member 61.

The check valve 71 comprises a small steel ball 73, a valve seat definition member 74 that has an annular valve seat at its upper end against which the steel ball 73 contacts and that defines the lower end portion of the air supply passage 65, and a compression spring 75 that biases the steel ball 73 towards the annular valve seat. When, during releasing of clamping, pressurized air at the first pressure is charged into the air operating chamber 47, the pressurized air at the first pressure is supplied to the support air chamber 63 via the air supply passage 65 and the check valve 71; and, during clamping operation, when pressurized air is discharged from the air operating chamber 47, the air supply passage 65 is intercepted by the check valve 71. It should be understood that a similar function would be obtained even if the compression spring 75 were to be omitted.

While the communicating air passage 72 is a small diameter passage, the communicating air passage 72 is intercepted by the upper wall of the containment aperture 59 and holds pressurized air in the support air chamber 63, only when the annular pressure receiving piston member 61 is in its upper limit position. But, when the annular pressure receiving piston member 61 shifted downwards, the communicating air passage 72 is opened. When the pressurized air introduction means 8 that will be described hereinafter is operating, pressurized air at a second pressure that is lower than the first pressure is introduced into the portions of the interior of the clamp main body 1 that are more towards the engagement assembly 2 than the annular pressure receiving piston member 61. Due to this, when the communicating air passage 72 is opened, the pressure of the pressurized air in the support air chamber 63 is reduced from the first pressure to the second pressure, and thus no pneumatic force operates any longer on the annular pressure receiving piston member 61, either in the upward direction or in the downward direction. It should be understood that, within the containment aperture 59, a clearance through which air can pass is defined at the external circumference of the engagement flange portion 61*a*.

When the above pressurized air introduction means 8 is not operating, when the communicating air passage 72 is opened, the support air chamber 63 is in the state of being opened to the atmosphere. It should be understood that it would also be acceptable to interpose a check valve in this communicating air passage 72 that only permits discharge of pressurized air from the support air chamber 63. Moreover, in order to enhance the performance for interception of the communicating air passage 72, in some cases, a seal member made from synthetic resin may be provided at a portion of the upper wall of the containment aperture 59 that corresponds to the communicating air passage 72, or at a portion of the annular pressure receiving piston member 61 that surrounds the upper end of the communicating air passage 72.

Next, the pressurized air introduction means 8 will be explained. As shown in FIG. 3, the pressurized air introduction means 8 is a device for blowing air against the engagement assembly 2 and the clamp rod 3 with pressurized air at the second pressure that, is lower than that of the pressurized air which is at the first pressure, and for introducing pressurized air at the second pressure to the portion within the clamp main body 1 that is more towards the engagement assembly 2 than the annular pressure receiving piston member 61. The pressurized air introduction means 8 comprises a pressurized air ejection hole 80*b* and a plurality of air passages 80*c* and 80*d* that are formed in the upper main body member 11, and an air passage 80*e* that is formed in the base main body member portion 13 and that is connected to a pressurized air supply source 81. The end portion of the air passage 80*c* is closed by a plug 82.

An annular clearance 86 is defined between the upper main body member 11 and the support member 62, and a small hole 80*a* is defined at the lower end portion of the support member 62. Pressurized air from the pressurized air supply source 81 is supplied to the annular clearance 86 via the air passages 80*c* through 80*e* and the pressurized air ejection hole 80*b*, and flows upwards along the outer circumferential surface of the support member 62 to be blown against the engagement assembly 2 and the clamp rod 3. A portion of the pressurized air supplied to the annular clearance 86 is supplied via the small hole 80*a* to the portion of the interior of the clamp main body 1 within the support member 62 that is more towards to the engagement assembly 2 than the annular pressure receiving piston member 61, and this pressurized air flows upwards within the clamp main body 1, is blown against the engagement assembly 2 and the clamp rod 3, and is then blown against the seating surfaces 18. It should be understood that air blowing against the workpiece W is also performed during the cutting process.

Next, the clamping miss detection means 9 will be explained.

As shown in FIGS. 2 and 4, a pressurized air ejection hole 91 (i.e. a pressurized air ejection hole 91 for clamping miss detection) that is sealed by the annular pressure receiving piston member 61 when the clamp rod 3 is shifted to its limit position in the clamping direction and the annular pressure receiving piston member 61 is shifted to its lower limit position, and air passages 92 through 96 that supply pressurized air to this pressurized air ejection hole 91 are provided, and the air passage 96 is connected to a pressurized air supply source 98. The clamping miss detection means 9 comprises the pressurized air ejection hole 91, the air passages 92 through 96, a pressure switch 97 that detects the fact that the pressure of the pressurized air in the air passages 92 through 96 has risen to a predetermined pressure or greater, and a control unit that receives the detection signal from the pressure switch 97 and determines the pressure rise described above.

The pressurized air ejection hole 91 that opens to face the engagement flange portion 61*a* is formed in the lower end portion of the circumferential wall portion of the containment aperture 59, and the air passage 92 that continues on from the ejection hole 91, are formed in the lower main body member 12. The air passages 93 through 95 that are connected to the air passage 92 are formed in the upper main body member 11. And the air passage 96 that is connected to the air passage 95 is formed in the base main body member 13. It should be understood that the end portion of the air passage 94 is blocked by a plug 94*a*.

The clamping miss detection means 9 is a device which, during clamping operation, detects whether or not the grip claw portions 22 of the engagement assembly 2 have slipped with respect to the inner circumferential surface of the hole in the workpiece W, i.e. whether the clamping is successful or not. Since, clamping miss occurred, the pressurized air ejection hole 91 is closed by the engagement flange portion 61*a* when the annular pressure receiving piston member 61 has been lowered to its lower limit position, accordingly the elevation of the pressure of the pressurized air is detected by the pressure switch 97 and the control unit, so that the clamping miss can be detected.

Next, the operation of the clamp device C of the present invention will be explained.

When the workpiece W is to be clamped by the clamp device C, initially pressurized air at the first pressure is supplied to the air operating chamber for release 47. When this is done, as shown in FIG. 2, the annular pressure receiving piston member 61, the clamp rod 3, the piston member 42, and the support member 62 are raised against the resistance of the biasing force of the plurality of compression coil springs 46 in the spring holding chamber 45 and are brought into their upper limit positions, so that the clamp rod 3 is raised relatively to the engagement assembly 2 and the engagement assembly 2 is put into its diameter-reduced state.

At this time, pressurized air at the first pressure is also supplied to the support air chamber 63 via the air supply passage 65, and support force is generated to support the support member 62 and the engagement assembly 2. Next, the pressurized air introduction means 8 is operated and pressurized air at the second pressure is supplied, the workpiece W is brought in while blowing air against the engagement assembly 2 and the clamp rod 3 and so on, the engagement assembly 2 and the clamp rod 3 are inserted into the hole in the workpiece W, and the workpiece W is supported by the seating surfaces 18.

Next, in order to drive the engagement assembly 2 and the clamp rod 3 downwards for clamping, pressurized air is discharged from the air operating chamber 47 and the air operating chamber 47 is brought to atmospheric pressure, so that the elastic force of the compression coil springs 46 operates on the piston member 42 in the downwards direction. At this time, according to requirements, pressurized air may be supplied to the spring holding chamber 45. When this is done, since the pressurized air in the support air chamber 63 is maintained by the check valve 71, accordingly the annular pressure receiving piston member 61 receives the pressure of the air in the support air chamber 63 and is held at its upper limit position described above, and, although the support member 62 and the engagement assembly 2 are also instantaneously held at their upper limit positions, since the piston member 42 is driven downwards, the clamp rod 3 is shifted by only a small distance relatively to the engagement assembly 2.

As a result, the grip claw portions 22 of the engagement assembly 2 are driven by the tapered shaft portion 31 of the clamp rod 3 so that their diameter is expanded, and so that they come into their engaged state in which they bite into the inner circumferential surface of the hole in the workpiece W (i.e. into their gripping state), and the clamp rod 3 comes into the close state in which it cannot shift relatively to the engagement assembly 2.

Directly after this state has eventuated, as shown in FIG. 4, due to the biasing force of the plurality of compression coil springs 46 (i.e. due to the biasing force of the pneumatic force exerted when pressurized air is supplied to the spring holding chamber 46), the piston member 42, the engagement assembly 2, the clamp rod 3, the annular pressure receiving piston member 61, and the support member 62 are driven integrally downwards by only a minute distance (for example 0.2 mm), and the workpiece W comes into the clamped state in which it is strongly pressed against the seating surfaces 18.

At this time, since the annular pressure receiving piston member 61 is separated from the upper wall of the containment aperture 59, accordingly the communicating air passage 72 of the pneumatic force release means 7 is opened, and the pressure of the pressurized air in the support air chamber 63 is reduced from the first pressure to the second pressure via the communicating air passage 72, so that at least a portion of the pneumatic force by which the engagement assembly 2 is supported by the support mechanism 6 is released; and, since no pneumatic force now operates on the annular pressure receiving piston member 61 either in the upwards direction or in the downwards direction, accordingly the annular pressure receiving piston member 61 is not shifted to its limit position in the clamping direction, but stops.

Due to this, during clamp driving, after the engagement assembly 2 has expanded in diameter (i.e. has performed gripping action), even though the annular pressure receiving piston member 61 only shifts downwards by a minute distance, since the pressurized air ejection hole 91 is not blocked by the engagement flange portion 61a of the annular pressure receiving piston member 61, accordingly the clamping miss detection means 9 does not detect the clamping miss.

Next, the advantages of the clamp device C of the present invention will be explained.

When the workpiece W is clamped, and when the engagement to assembly 2 is expanded in diameter and is engaged to the inner circumferential surface of the hole in the workpiece W, while it is possible reliably to expand the diameter of the engagement assembly 2 in the state in which the engagement assembly 2 is supported by the support mechanism 6 that supports it with the pneumatic force of the pressurized air at the first pressure, when the clamp rod 3 is driven for clamping, it is possible to prevent reduction of the clamping force by just the amount of the pneumatic force that has been released, since at least a portion of the pneumatic force of the support mechanism 6 is released by the pneumatic force release means 7 after the engagement assembly 2 has been expanded in diameter. Since it is possible to prevent reduction of the clamping force, accordingly it is possible to suppress increase of the size of the drive means 4, and it is possible to make the clamp device C more compact.

Since the drive means 4 is provided with the air cylinder for unclamping 35 that releases clamping, and since the support mechanism 6 includes the annular pressure receiving piston member 61, the support air chamber 63 that causes this annular pressure receiving piston member 61 to receive the pressure of pressurized air at the first pressure in the opposite orientation to the clamping direction, and the air supply passage 65 that connects from the air operating chamber for unclamping 47 of the air cylinder for unclamping 35 to the support air chamber 63, accordingly it is possible to supply the pressurized air at the first pressure that is supplied to the air cylinder for unclamping 35 to the support air chamber 63 via the air supply passage 65. And the pressurized air introduction means 8 introduces pressurized air at the second pressure lower than the first pressure to the portion within the clamp main body 1 that is more towards the engagement assembly 2 than the annular pressure receiving piston member 61, and is able to blow air against the engagement assembly 2 and the clamp rod 3, so that it is possible to prevent the ingress of swarf or dust to within the clamp main body 1.

While the pressurized air for being blown at the second pressure operates on the upper surface of the annular receiving piston member 61, since the pneumatic force of the pressurized air at the first pressure (which is higher than the second pressure) in the support air chamber 63 operates on its lower surface, accordingly it is possible for the annular pressure receiving piston member 61 to be held at almost its upper limit position.

Since, due to the check valve 71, the flow of pressurized air is only permitted in the direction to supply pressurized air from the air operating chamber 47 to the support air chamber 63, accordingly, while it is possible to supply pressurized air to the support air chamber 63, it is also possible to maintain the pressurized air in the support air chamber 63. During clamp driving, when the annular pressure receiving piston member 61 has shifted downwards by a minute distance, a portion of the pressurized air at the first pressure in the support air chamber 63 is relieved to above the annular pressure receiving piston member 61 via the communicating air passage 72, so that it is possible to cancel a portion of the pneumatic force that operates on the annular pressure receiving piston member 61.

And since the pressurized air in the support air chamber 63 is reduced from the first pressure to the second pressure via the communicating air passage 72, since the air pressure above and below the annular pressure receiving piston member 61 on both sides thereof is kept at the second pressure, and since it is possible to suppress shifting of the annular pressure receiving piston member 61 to its limit position in the clamping direction, accordingly, it is still possible reliably to prevent erroneous operation of the clamping miss detection means 9 that, notwithstanding that the engagement assembly 2 is gripping the inner circumferential surface of the hole in the workpiece W, the engagement assembly 2 has slipped with respect to the inner circumferential surface.

Since the pressurized air ejection hole 91 that, when the clamp rod 3 has been shifted to its limit position in the clamping direction, is sealed by the annular pressure receiving piston member 61 and which is for clamping miss detection and the air passage 92 for supplying pressurized air to this pressurized air ejection hole 91 are provided, accordingly it is possible to implement clamping miss detection with a simple structure that operates reliably.

The clamp rod 3 can be driven in the clamping direction by the clamping drive means 36 that is provided to the drive means 4. And the clamp rod 3 can be driven in the clamping direction by the one or a plurality of compression coil springs 46 that are provided to the clamping drive means 36.

Embodiment 2

Next, a clamp device CA of a second embodiment will be explained on the basis of FIGS. 5 and 6. However, similar reference numerals will be appended to elements that are similar to ones of the first embodiment, and explanation thereof will be omitted, with those structures that are different being explained in most detail.

Figure 5:
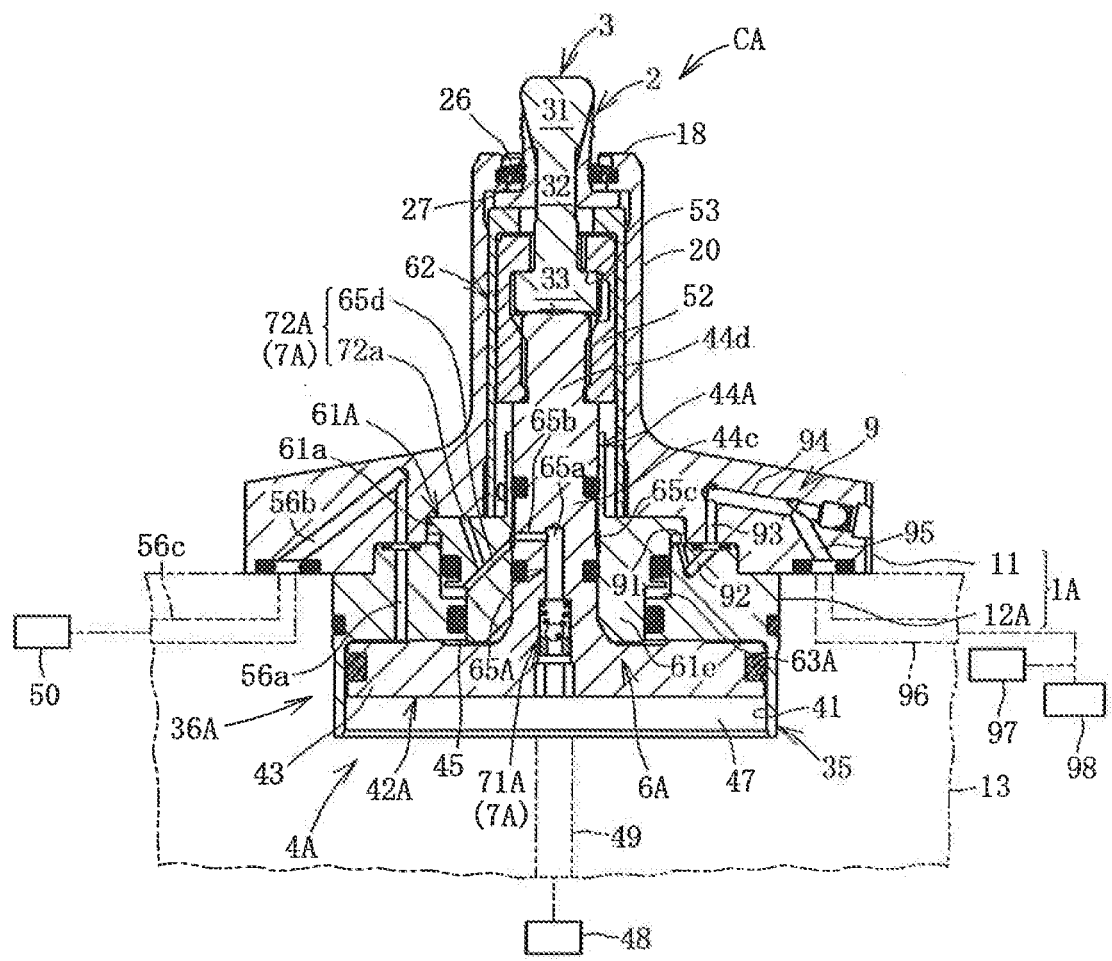
FIG. 5 is a vertical sectional view of a clamp device (in its unclamped state) according to Embodiment #2.
Figure 6:
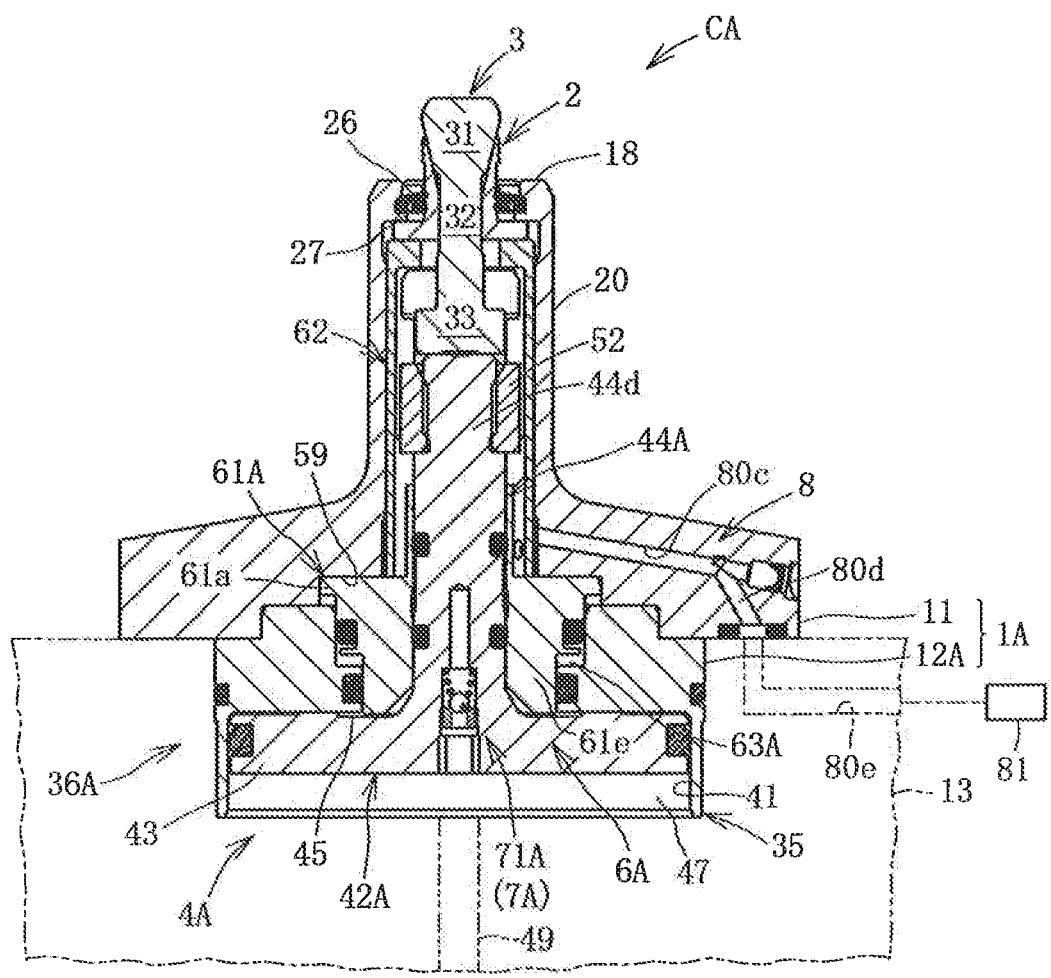
FIG. 6 is a vertical sectional view of the clamp device (in its unclamped state)

As shown in FIGS. 5 and 6, the clamp device CA comprises a clamp main body 1A, an engagement assembly 2, a clamp rod 3, a drive means 4A for driving the clamp rod 3 to and fro, a support mechanism 6A, a pneumatic force release means 7A, a pressurized air introduction means 8, and a clamping miss detection means 9. The clamp main body 1A comprises an upper main body member 11 and a lower main body member 12A.

In the drive means 4A, the compression coil springs 46 described above are omitted, and it is arranged for the clamp driving to be performed by an air cylinder for clamping 36A. The air cylinder for unclamping 35 is the same as in the first embodiment.

In the case of the support mechanism 6A, the shape of the annular pressure receiving piston member 61A is changed. In the annular pressure receiving piston member 61A, while the piston portion and the engagement flange portion 61a are the same as in the first embodiment, a small diameter piston portion 61e is formed to extend downwards from the lower end of the piston portion.

The support air chamber 63A is communicated with the air operating chamber 47 of the air cylinder for unclamping 35 by an air supply passage 65A in which a check valve 71A is provided. The air supply passage 65A comprises a vertically oriented air passage 65a and a horizontally oriented air passage 65b that are formed in the piston member 42A and the rod portion 44A, an annular groove 65c, and a sloping air passage 65d that is formed in the annular pressure receiving piston member 61A. The check valve 71A is provided in the lower end portion of the air supply passage 65A, in a similar manner to the first embodiment. A communicating air passage 72A that communicates the support air chamber 63A with the space above the annular pressure receiving piston member 61A is defined by the sloping air passage 72a and the lower portion of the sloping air passage 65d.

An air operating chamber for clamping 45 is formed within the clamp main body 1A above the piston portion 43A, and pressurized air can be supplied from a pressurized air supply source 50 to the air operating chamber for clamping 45 via air passages 56a through 56c. The lower end of the small diameter piston portion 61e of the annular pressure receiving piston member 61A projects into the air operating chamber for clamping 45, and receives the pressure of the pressurized air in the air operating chamber for clamping 45. The pneumatic force release means 7A comprises the air supply passage 65A, the check valve 71A, and the communicating air passage 72A, and is a means that provides a similar function to that of the pneumatic force release means 7 of the first embodiment.

The operation of the support mechanism 6A will now be explained.

During the clamp released state, pressurized air at the first pressure is supplied to the air operating chamber for unclamping 47 and to the support air chamber 63A, and the annular pressure receiving piston member 61A is at its upper limit position and the communicating air passage 72A is intercepted. And, during clamp driving, the support force of the support mechanism 6A is generated due to the pneumatic force that exerts on the annular pressure receiving piston member 61A that receives the pressure of the pressurized air at the first pressure in the support air chamber 63A.

In the state in which the engagement assembly 2 is supported by the support force via the support member 62, the pressurized air in the air operating chamber for unclamping 47 is released, and pressurized air is supplied to the air operating chamber for clamping 45 and clamp driving is performed. When this is done, a strong support force is generated, since the pressurized air at the first pressure in the support air chamber 63A is maintained and the small diameter piston portion 61e receives the pressure of the pressurized air in the air operating chamber for clamping 45. When this clamp driving starts, the engagement assembly 2 expands in diameter and grips the inner circumferential surface of the hole in the workpiece W.

When, just after this, the clamp rod 3 and the engagement assembly 2 lower together by a minute distance (for example 0.2 mm), since the upper end of the communicating air passage 72A is open, the pressure of the pressurized air in the support air chamber 63A decreases to the second pressure, the annular pressure receiving piston member 61A receives the pressure of the pressurized air from the air operating chamber for clamping 45 on the small diameter piston portion 61e, and its upwardly biased state is maintained by this pneumatic force. Since, during clamp driving in this manner, the pneumatic force from which a portion of the above described strong support force has been eliminated continues to operate, accordingly the annular pressure receiving piston member 61A does not lower down to its lower limit position, so that it is reliably possible to prevent erroneous detection of clamping quality by the clamping miss detection means 9. Since the other operations and advantages are the same as in the first embodiment, accordingly explanation thereof will be omitted.

Embodiment 3

Next, a clamp device CB of a third embodiment will be explained on the basis of FIG. 7. However, similar reference numerals will be appended to elements that are similar to ones of the first embodiment, and explanation thereof will be omitted, with those structures that are different being explained in most detail.

Figure 7:
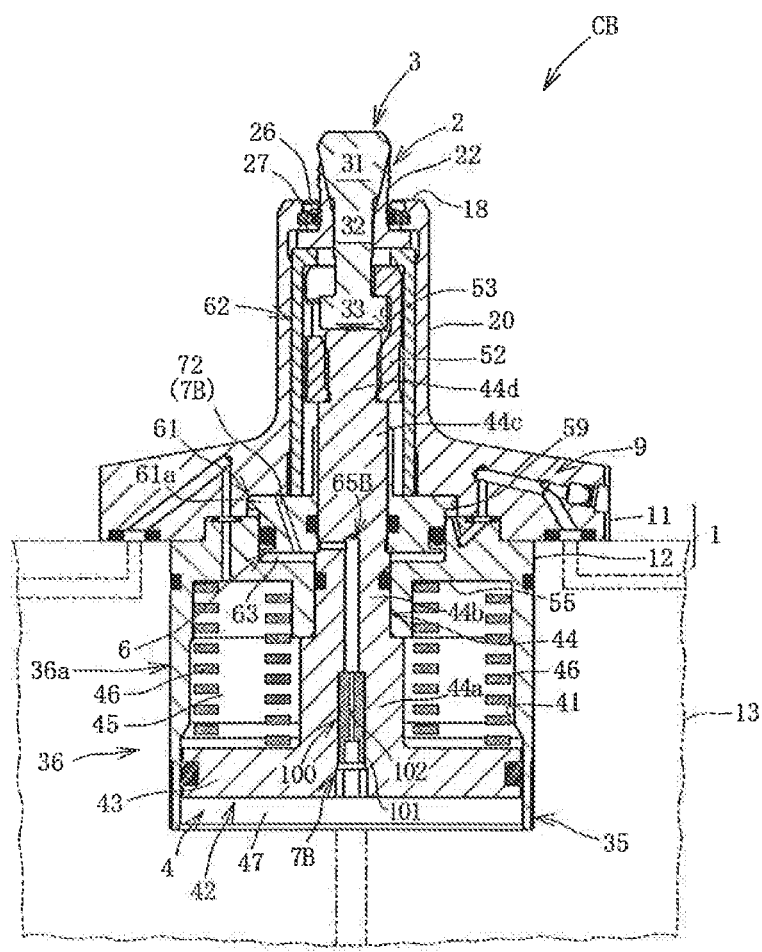
FIG. 7 is a vertical sectional view of a clamp device (in its unclamped state) according to Embodiment #3.

With the clamp device CB of FIG. 7, instead of the pneumatic force release means 7 of the clamp device C of the first embodiment, a pneumatic force release means 7B is provided. This pneumatic force release means 7B is provided with a throttle valve 100 at the lower end portion of the air supply passage 65B. In this throttle valve 100, a valve forming member 101 is screwingly engaged into an installation hole in the piston member 42, and a throttle passage 102 is formed in the valve forming member 101.

With this structure, since this throttle valve 100 is provided, accordingly, when clamp driving starts and pressurized air at the first pressure is discharged from the air operating chamber 47, by discharging pressurized air from the support air chamber 63 via the throttle valve 100 with a predetermined delay, a portion of the pneumatic force that exerts on the annular pressure receiving piston member 61 due to the pressurized air is canceled, and the engagement assembly 2 is expanded in diameter in the state in which a portion of the pneumatic force is maintained. The clamping operation after this expansion in diameter is the same as in the first embodiment.

Next, examples in which the above embodiments are partially altered will be explained.

[1] In the first and second embodiments, when the clamp rod 3 is driven for clamping, if the pressurized air introduction means 8 is not provided, then it would also be acceptable to implement a structure such that all of the pneumatic force of the support mechanisms 6 and 6A is eliminated after the diameter of the engagement assembly 2 has been expanded. In this case, during clamp driving, when after gripping the annular pressure receiving piston members 61 and 61A shift downwards by a minute distance, the support air chambers 63 and 63A are opened to atmosphere via the communicating air passages 72 and 72A, and it is possible to eliminate the entire pneumatic force of the pressurized air at the first pressure. At this time, it is possible to prevent decrease of the clamping force by just the amount of this pneumatic force that has been canceled.

[2] The structure of the chec valves 71 and 71A in the first and second embodiments, and the structure of the throttle valve 100 in the third embodiment, are not necessarily limited to those shown in the above examples; other structures would also be acceptable, provided that they provide the same functions.

[3] It would also be possible to apply the present invention to a clamp device of the first through the third embodiments, having a shape in which the main body barrel portion 20 of the clamp main body 1 or 1A is shortened, or in which the main body barrel portion 20 is omitted.

[4] Apart from the above, for a person skilled in the art, it would be possible to implement various changes and additions to the form of the above embodiments without deviating from the spirit of the present invention, and the present invention should be understood to include such type of variant embodiment.

The present invention is one by which a clamp device is provided, with which it is arranged to grip and clamp to the inner circumferential surface of a hole in a workpiece for machining, by inserting grip claw portions of an engagement assembly into the hole, and by expanding their diameter with a clamp rod. Moreover, the present invention can also be applied to clamp devices applicable for conveyance of a workpiece or the like, and also can be applied when clamping a member other than a workpiece.

DESCRIPTION OF NUMERALS

C, CA: clamp devices
W: workpiece
1, 1A: clamp main bodies
2: engagement assembly
3: clamp rod
4, 4A: drive means
6, 6A: support mechanism
7, 7A, 7B: pneumatic force release means
8: pressurized air introduction means
9: clamping miss detection means
35: air cylinder for unclamping
36, 36A: engagement assembly
36a: air cylinder for clamping
41: cylindrical hole
42: piston member
43: piston portion
45: spring holding chamber
46: compression coil spring
47: air operating chamber for unclamping
61, 61A: annular pressure receiving piston member
63, 63A: support air chamber
65, 65A: air supply passage
71, 71A: check valve
72, 72A: communicating air passage
100: throttle valve

The invention claimed is:

1. A clamp device comprising:
   a clamp main body;
   an engagement assembly that can be changed over between a diameter-expanded state in which the engagement assembly engages with an inner circumferential surface of an aperture in a workpiece and a diameter-reduced state in which the engagement assembly does not so engage;
   a clamp rod that is engaged with an interior of the engagement assembly;
   a drive means for driving the clamp rod to and from with respect to the clamp main body;
   a support mechanism that, when said engagement assembly is expanded in diameter and is engaged with said inner circumferential surface, supports the engagement assembly with a pneumatic force of pressurized air at a first pressure; and
   a pneumatic force release means that, when the clamp rod is driven for clamping by said drive means, releases at least a part of the pneumatic force of said support mechanism after said engagement assembly has been expanded in diameter to engage with said inner circumferential surface.

2. A clamp device according to claim 1, wherein said drive means comprises an air cylinder for unclamping that releases the clamping of the clamp rod;
   said support mechanism comprises an annular pressure receiving piston member that supports said engagement assembly, a support air chamber that applies pressurized air at said first pressure to the annular pressure receiving piston member in an opposite orientation to said clamping direction; and an air supply passage that leads from an air operating chamber for unclamping of said air cylinder for unclamping to said support air chamber; and
   in order to blow air against said engagement assembly and said clamp rod with pressurized air at a second pressure lower than said first pressure, a pressurized air introduction means is provided that introduces pressurized air at said second pressure to a portion within the clamp main body that is more towards the engagement assembly than the annular pressure receiving piston member.

3. A clamp device according to claim 2, wherein said pneumatic force release means comprises a check valve interposed in said air supply passage that permits flow in the direction to supply pressurized air to the support air chamber, and a communicating air passage that is formed to pierce through said annular pressure receiving piston member and that is intercepted only when said annular pressure receiving piston member is in an upper limit position.

4. A clamp device according to claim 2, wherein said pneumatic force release means comprises a throttle valve that is interposed in said air supply passage, and a communicating air passage that is formed to pierce through said annular pressure receiving piston member and that is intercepted only when said annular pressure receiving piston member is in an upper limit position.

5. A clamp device according to claim 2, wherein there are provided a pressurized air ejection hole for detection of clamping miss that is blocked by said annular pressure receiving piston member when said clamp rod is shifted to a limit position in the clamping direction, and an air passage that supplies pressurized air to the pressurized air ejection hole.

6. A clamp device according to claim 1, wherein said drive means comprises a clamping drive means for driving said clamp rod in the clamping direction.

7. A clamp device according to claim 6, wherein said clamping drive means comprises one or a plurality of compression springs that drive the clamp rod in the clamping direction.

8. A clamp device according to claim 6, wherein said clamping drive means comprises an air cylinder for clamping that generates all or a portion of a drive force for clamp driving the clamp rod for clamping.

\* \* \* \* \*